United States Patent
Cameron

[19]

[11] Patent Number: 6,154,340
[45] Date of Patent: *Nov. 28, 2000

[54] LOW VELOCITY DISK DRIVE LOAD CONTROLLER

[75] Inventor: T. Jay Cameron, Correlitos, Calif.

[73] Assignee: Seagate Technology, Inc., Scotts Valley, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/887,795

[22] Filed: Jul. 3, 1997

Related U.S. Application Data

[60] Provisional application No. 60/031,913, Nov. 22, 1996.

[51] Int. Cl.$^7$ ........................................ G11B 5/54
[52] U.S. Cl. .................. 360/105; 360/75; 360/78.06
[58] Field of Search ................... 360/75, 78.06, 360/78.12, 97.01, 105

[56] References Cited

U.S. PATENT DOCUMENTS

| | | | |
|---|---|---|---|
| 4,530,021 | 7/1985 | Cameron | 360/75 X |
| 4,589,036 | 5/1986 | Bertschy et al. | 360/75 |
| 4,755,892 | 7/1988 | Carteau et al. | 360/75 |
| 4,864,437 | 9/1989 | Couse et al. | 360/75 |
| 5,018,029 | 5/1991 | Ekhoff et al. | 360/69 |
| 5,315,455 | 5/1994 | Ito | 360/75 |
| 5,384,675 | 1/1995 | Crawforth et al. | 360/75 |
| 5,615,064 | 3/1997 | Blank et al. | 360/75 |
| 5,663,846 | 9/1997 | Masuoka et al. | 360/75 |
| 5,828,522 | 10/1998 | Brown et al. | 360/105 |

FOREIGN PATENT DOCUMENTS

| | | |
|---|---|---|
| 54-109410 | 8/1979 | Japan . |
| 58-001858 | 1/1983 | Japan . |
| 61-217965 | 9/1986 | Japan . |
| 5-182383 | 7/1993 | Japan . |
| 6-267222 | 9/1994 | Japan . |

*Primary Examiner*—William Klimowicz
*Attorney, Agent, or Firm*—Shawn B. Dempster; Edward P. Heller; Jonathan E. Olson

[57] ABSTRACT

The method disclosed is generally directed to a process for controlling the velocity of an actuator arm assembly during a load from a ramp. A process in accordance with the invention includes applying an alternating current to the VCM to eliminate frictional effects. An increasing current is applied to the VCM. The increasing current is an increasing function of time in one embodiment of the invention and is determined such that the heads are loaded at a predetermined velocity. In one embodiment, the predetermined velocity is 1 in/sec.

7 Claims, 6 Drawing Sheets

FIG. 3
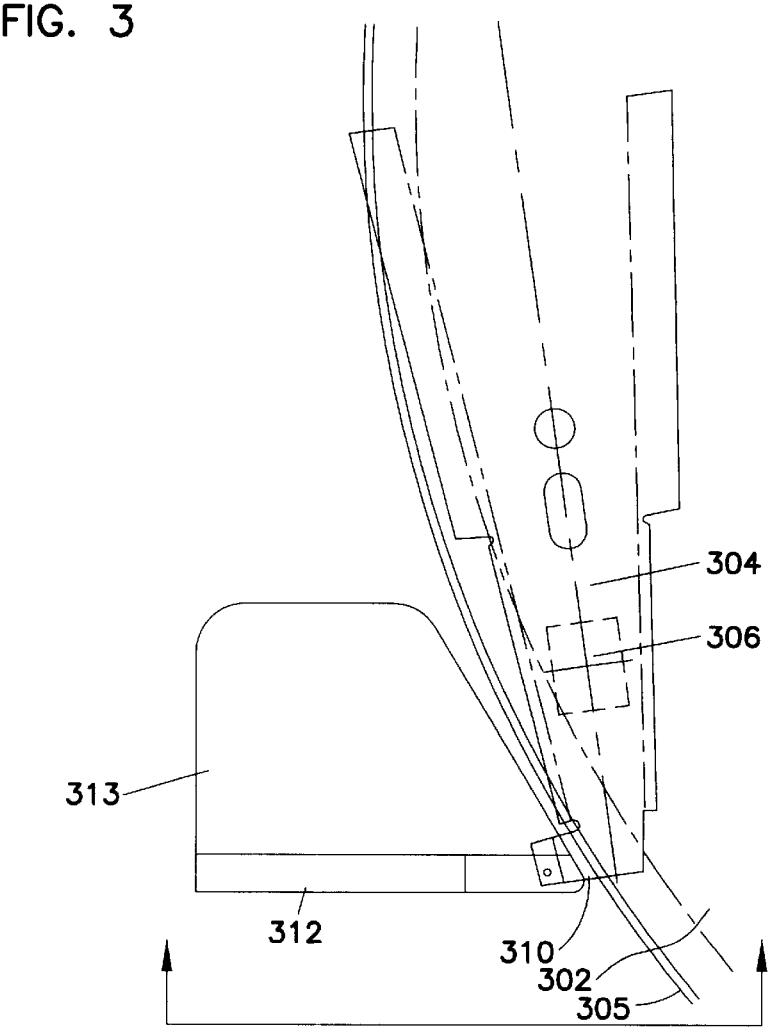
Fig. 4A
FIG. 4a
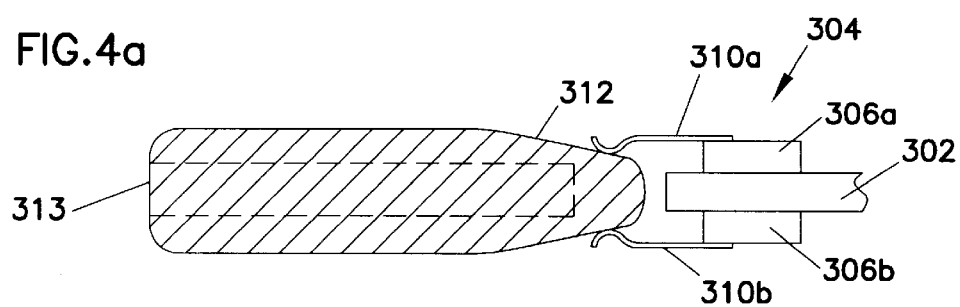
FIG. 4b
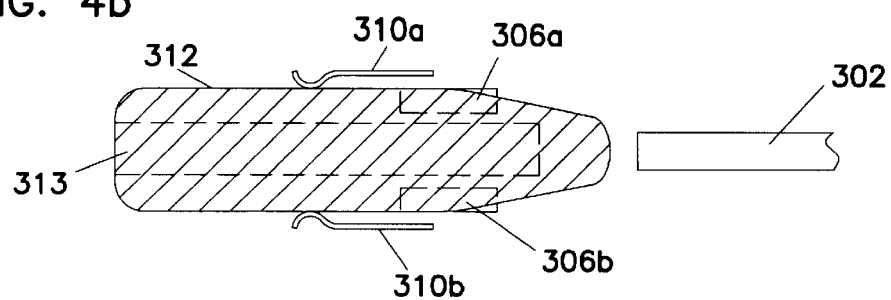

LOW VELOCITY DISK DRIVE LOAD CONTROLLER

CROSS-REFERENCE TO RELATED APPLICATIONS

This application claims the benefit of U.S. Provisional Application No. 60/031,913, filed Nov. 22, 1996.

BACKGROUND OF THE INVENTION

1. Field of Invention

The present invention relates to disk drives and particularly to a process for loading the actuator arm from a ramp to a position on a disk in a disk drive.

2. Related Art

A portion of a disk drive 100 is shown in the plan view of FIG. 1. A typical disk drive includes a disk 102 and an actuator arm assembly 104, which may consist of one or more parts, including a base plate, a load beam, and/or a flexure. Actuator arm assembly 104 supports a slider towards one end of the actuator arm and on the disk side of the actuator arm. Mounted to the slider is a magnetic element used to write data and an electronic element used to read data. The combined structure of the slider, the magnetic element, and the electronic element is referred to herein as a head 106. The actuator arm assembly 104 acts as a suspension system for the head 106 that allows the head to "fly" over the surface of the disk 102 on an air flow created by rotation of the disk. Typically, the head 106 will position itself, i.e., establish an air bearing, to fly approximately 2 μm over the disk surface. When the head is in a position allowing it to "fly" over the disk, the head is generally said to be "on" the disk, although no physical contact with the disk is generally had.

Actuator arm assembly 104 also pivots radially to move the head 106 to a specified radial position on disk 102. The force necessary to pivot actuator arm assembly 104 is created by a voice coil motor 108, which includes a coil and a magnet structure (not shown) positioned about the coil. The magnet structure and the coil are arranged so that the coil is placed in the magnetic field created by the magnet. Currents running through the coil in opposite directions interact with the magnetic field to create torques in respective opposite directions so that actuator arm assembly 104 may be pivoted to position the head 106 at a selected location between the inside diameter 103 and outside diameter 105 of disk 102.

To avoid data loss, typically, when the disk or the disk drive is not in use, the actuator arm is moved to a position away from the data-carrying portion of the disk. Referring to FIGS. 1 and 2, one way to avoid data loss is to pivot the actuator arm assembly to a resting position on a ramp positioned near outside diameter 105. To do so, the actuator arm assembly 104 is brought to a position near the outside diameter 105 of the disk 102. A ramp interface mechanism such as the tab extension 110 shown in FIGS. 1 and 2 is then able to make contact with a ramp 112. As the actuator arm assembly 104 is moved further in a clockwise direction, the actuator arm assembly 104 is moved up ramp 112, away from disk 102.

When required, the head 106 is loaded onto the disk 102 where reading and writing can occur. To load the head, the actuator arm assembly 104 is pivoted in a counter-clockwise direction. The ramp interface 110 progresses down ramp 112 towards the disk. The nature of the head suspension system allows the head to dangle when unloaded from the disk, so that when the head 106 first reaches a position above the disk, the head 106 is not always perfectly positioned parallel to the disk surface. When brought into the disk's air flow, however, the suspension system enables the head to reposition itself through spring-like and gimbaling actions.

Because the head is often not held parallel to the disk surface when unloaded, if the head 106 is loaded too quickly, the head may not have an adequate opportunity to reposition itself. In some situations, the corner or other parts of the head may come in contact with disk 102 before a proper parallel position is established. Such contact will tend to damage data stored on disk 102. Such contact could also significantly affect the time it takes to establish a proper position as any contact may cause the head to have erratic and other wobbling-type movements from which the head will have to recover. Therefore, actuator arm assembly velocity is a significant factor in loading the head onto the disk 102. The slower the load, the less risk that any damage to the disk or significant wobbling of the head 106 will occur.

Nevertheless, controlling and establishing slow load velocities is problematic. When the head is not loaded, the only method available in current disk drive designs to get an approximation of actuator arm assembly velocity is to measure the back EMF (BEMF) of the VCM. Further, the torque needed to overcome various forces (e.g., friction between the ramp interface 110 and ramp 112, torque from the printed circuit cable (not shown), and/or friction at the actuator pivot point) is significant, tending to be much higher than the additional torque required to generate a low velocity movement. Thus, the VCM voltage due to currents applied to generate low velocities is very high compared to the BEMF generated due to the velocity of a slow moving actuator, and accuracy in velocity measurement and control is difficult to obtain. To compound matters, in order to maintain a constant velocity a change in torque is required when the tab extension 110 moves from the flat portion 113 to the sloped portion 114 of ramp 112.

Moreover, consumers often seek cheap, physically small disk drives. Therefore, adding parts and/or other electronics to a disk drive to control velocity is not generally desirable.

Therefore, a method for controlling the actuator arm assembly load velocity is desirable where such a controller would be relatively inexpensive to implement and would be able to establish accurate control of the actuator arm assembly at low velocities.

SUMMARY OF THE INVENTION

The present invention is generally directed toward a process for controlling an actuator arm assembly velocity during a load from a ramp to a position on a disk. A process in accordance with the invention is designed to allow precise control of the actuator arm assembly at very low velocities (e.g., 1 in/sec).

Specifically, in a system which includes a disk, an actuator arm assembly with a head and a ramp interface, a ramp and a voice coil motor (VCM), a method in accordance with the invention includes applying an alternating current to the VCM. By applying an alternating current to the VCM, any other current applied to the VCM will essentially drive a frictionless load. A method in accordance with the invention further includes applying an increasing current to the VCM. In one embodiment, the increasing current is increasing as a function of time. Finally, the ramp interface exits the ramp. In one embodiment of the invention the ramp interface exits the ramp at a predetermined velocity of 1 in/sec.

A method in accordance with the invention is advantageous in that such method allows precise control at very low velocities of an actuator arm assembly.

A method in accordance with the invention is further advantageous in that such method is relatively inexpensive to implement, requiring few, if any, additional parts over other methods.

Finally, a method in accordance with the invention is advantageous in that it requires little, if any, calibration of various circuit values.

Other advantages will be apparent to those of skill in the art upon a review of the detailed description below.

BRIEF DESCRIPTION OF THE DRAWINGS

The present invention is described with respect to particular exemplary embodiments thereof and reference is accordingly made to the drawings (which are not necessarily drawn to scale), in which like reference numbers denote like parts, and in which:

FIG. 3 is a plan view of a portion of an actuator arm assembly and ramp;

FIGS. 4a and 4b are side views of ramp 312 and actuator arm assembly 304 in various interactive positions;

DETAILED DESCRIPTION

Figure 1:
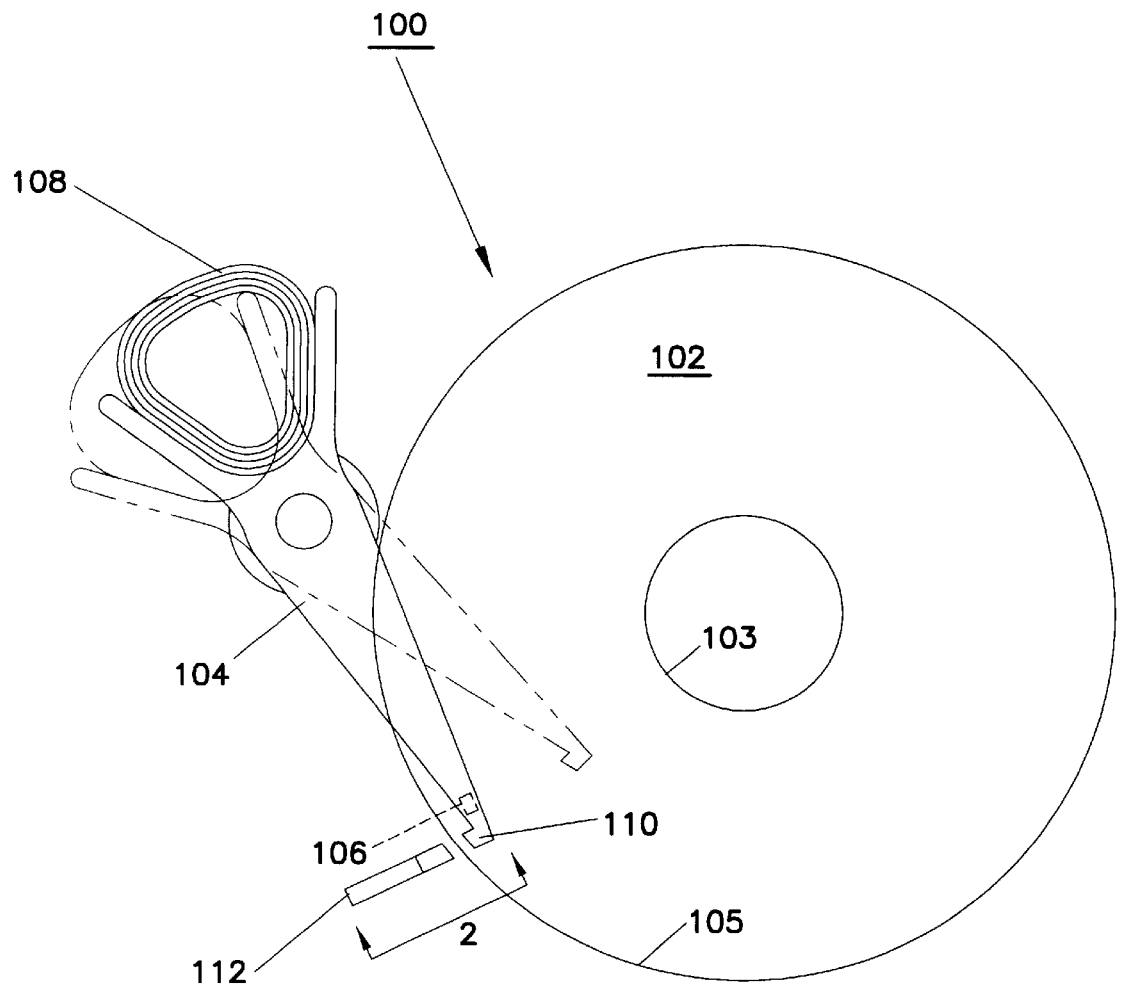
FIG. 1 is a plan view of a portion of a typical disk drive.
Figure 2:
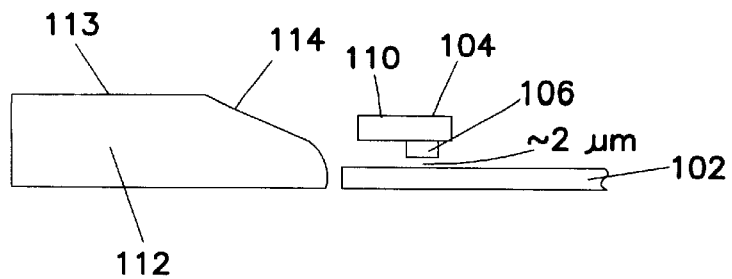
FIG. 2 is a side view of ramp 112 and actuator arm assembly 104 from FIG. 1.

In one embodiment of a method in accordance with the present invention, a ramp and actuator arm assembly interact with each other as shown in FIGS. 3, 4a, and 4b. When actuator arm assembly 304 is positioned near the outside diameter 305 of disk 302, ramp interface 310 comes into contact with ramp 312. As the actuator arm assembly continues to move clockwise, up ramp 312, head 306 is moved up and away from disk 302 to ultimately comes to rest above ramp wing 313. As shown in FIG. 4a, some embodiments of the invention may have more than one head, e.g., for reading from and writing to each surface of disk 302, and ramp wing 313 serves as additional protection between the heads 306a and 306b. FIG. 4a shows the position of the ramp interface 310 and heads 306a and 306b (generally referred to as head 306) with respect to ramp 312 when ramp interfaces 310a and 310b (generally referred to as ramp interface 310) first comes into contact with ramp 312. FIG. 4b shows the position of the ramp interface 310 and head 306 when the head has been unloaded from the disk 302.

To load the heads onto the disk 302 at a low velocity, several approaches have been taken. These approaches have each used a BEMF measurement of the VCM to approximate velocity. Further, these approaches have been based on the model shown in FIG. 5.

Figure 5:
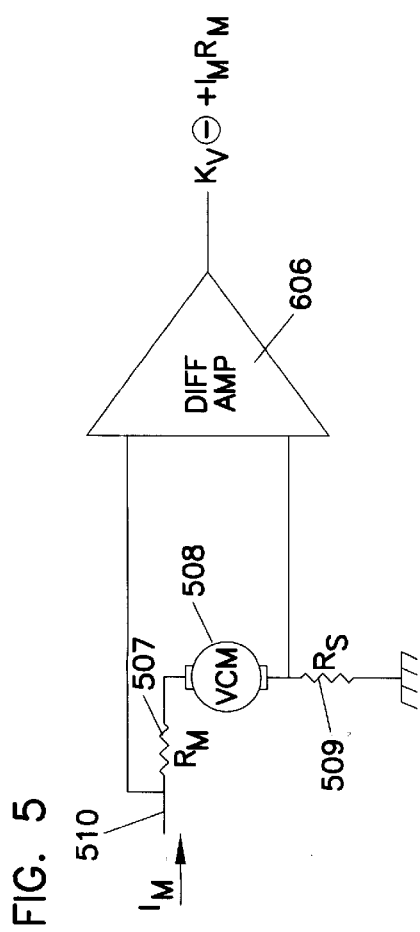
FIG. 5 is a schematic block diagram of a model of an ideal VCM coupled to a differential amplifier.

In FIG. 5, an ideal VCM 508 and a differential amplifier 606 are shown. The resistor representing the motor resistance, $R_M$ 507, is coupled between the VCM 508 and the input 510. Together, ideal VCM 508 and $R_M$ 507 approximate an actual VCM 308 to be discussed with reference to FIGS. 6 and 7. A sampling resistance, $R_S$ 509, is coupled between the VCM 508 and ground. Input 510 is further coupled to the differential amplifier 606. The second input of the differential amplifier is coupled to the node between the VCM 508 and $R_S$ 509. If a current $I_M$, is input on line 510 into the model of FIG. 5, the potential difference across the VCM 508 as measured by the differential amplifier is equal to:

$$K_{V\ominus} + I_M R_M,$$

where $K_V$ is a constant having the dimensions of volts/rad/sec and $\dot{\ominus}$ is velocity in rad/sec.

Based on the model of FIG. 5, a first approach to controlling velocity is as follows. The velocity of the actuator arm assembly can be approximated by measuring the potential across the VCM when $I_M$ is equal to 0. When $I_M$ is zero, the differential amplifier 606 output ($K_V\dot{\ominus}$) is proportional to velocity.

Figure 6:
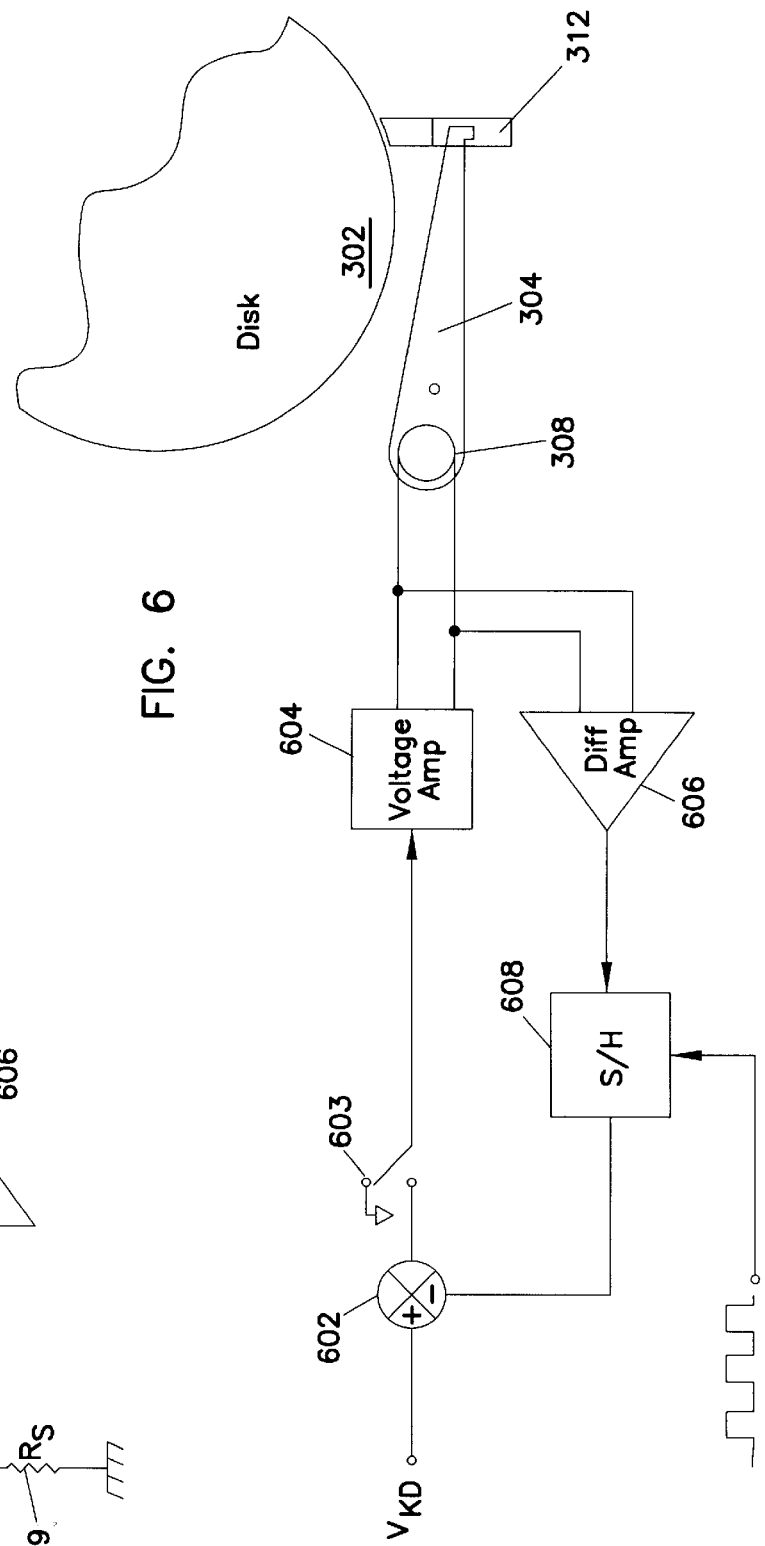
FIG. 6 is a schematic block diagram of a circuit used for controlling the velocity of an actuator arm assembly.

Using the closed loop control system shown in FIG. 6, feedback proportional to velocity can be obtained. A constant voltage, $V_{K\ominus}$, is input into a summer 602. The output of the summer 602 is coupled to a voltage amplifier 604 which drives the resulting amplified voltage differentially. The differential voltage from voltage amplifier 604 is applied to VCM 308. The potential difference across VCM 308 is measured by differential amplifier 606, whose output is coupled to sample and hold circuitry 608. Sample and hold circuitry 608 samples the output of differential amplifier 606 on the rising edge of a square wave input. The output of sample and hold circuitry 608 is then coupled to summer 602 to be subtracted from $V_{K\ominus}$ to obtain closed loop control.

To obtain feedback proportional to velocity with the circuit of FIG. 6, the current is forced to zero, e.g., with switch 603, for 20% of a sample period after a delay to account for the VCM voltage as a result of the zero current to be sampled. The resulting sampled voltage is applied to the summing node 602.

This first approach of taking a measurement to approximate velocity when current input is dropped to zero has several problems. First, while attempting to take a measurement to approximate velocity by dropping $I_M$ to 0, the coil inductance in the VCM tries to maintain current flow. Thus, when trying to measure the BEMF when $I_M=0$, time will be spent waiting for the current through the VCM to actually reach zero. Thus, the time to bring the current to zero limits the bandwidth available in determining an appropriate current to maintain a desired velocity.

Further, at very low velocities (e.g., 1 in/sec), the voltage potential difference measured across the VCM is very low (e.g., approximately 25 mV at 1 in/sec when $I_M$ is 0), causing precision to be imperative. Therefore, only higher velocities, e.g., 10 in/sec, have been utilized and controlled in this first approach, generating approximately 0.25V.

A second approach for controlling velocity is also based on the model of FIG. 5. Rather than setting $I_M=0$, this second approach subtracts $I_M R_{Mest}$ from the differential amplifier output, $K_V\ominus+I_M R_M$, to obtain a value proportional to velocity. In a closed loop circuit similar to that shown in FIG. 6, the result, $K_V\ominus+I_M R_M-I_M R_{Mest}$, is applied to the summing node 602 and subtracted from $K_V\ominus$. In one alternative embodiment, a DSP control program is used for closed loop control.

To estimate the motor resistance (i.e, to obtain $R_{Mest}$), a current is passed through the VCM while the actuator arm assembly is positioned against crash stops, preventing actuator movement. Therefore, only motor resistance is present without back EMF created by movement of the actuator. The potential difference is measured across the VCM and divided by the control current as input to obtain the estimated resistance.

This second approach of subtracting $I_M R_{Mest}$ from the differential amplifier output also suffers from difficulties. For instance, the minimum current generally required to overcome frictional forces and to begin to move the actuator is 60 mA, and $R_M$ is typically 10 Ω. Thus, at least 0.6V will be generated across the VCM in moving the actuator arm. Thus, the voltage generated by $I_M R_M$ (e.g., 0.6V) is much higher than that required to obtain the desired velocity (e.g., 25 mV). Because $I_M R_M$ is much larger than the potential difference expected at low velocities above $I_M R_M$, $R_M$ becomes a significant factor and $R_{Mest}$ must be precisely calibrated. Any errors in calibrating $R_{Mest}$ could result in significant velocity approximation errors. Moreover, $R_{Mest}$ needs to be frequently recalibrated, particularly because $R_M$ will change over time due to factors such as temperature. Thus, as in the first approach, only higher velocities than 1 in/sec, e.g., 10 in/sec, have been utilized, making $R_{Mest}$ calibration less critical.

Although both of the above-described approaches are able to achieve control of velocities as low as 10 in/sec, various tests by the inventor have shown that damage to data occurs at speeds of 10 in/sec. Thus, control at even lower velocities is desired.

Figure 7:
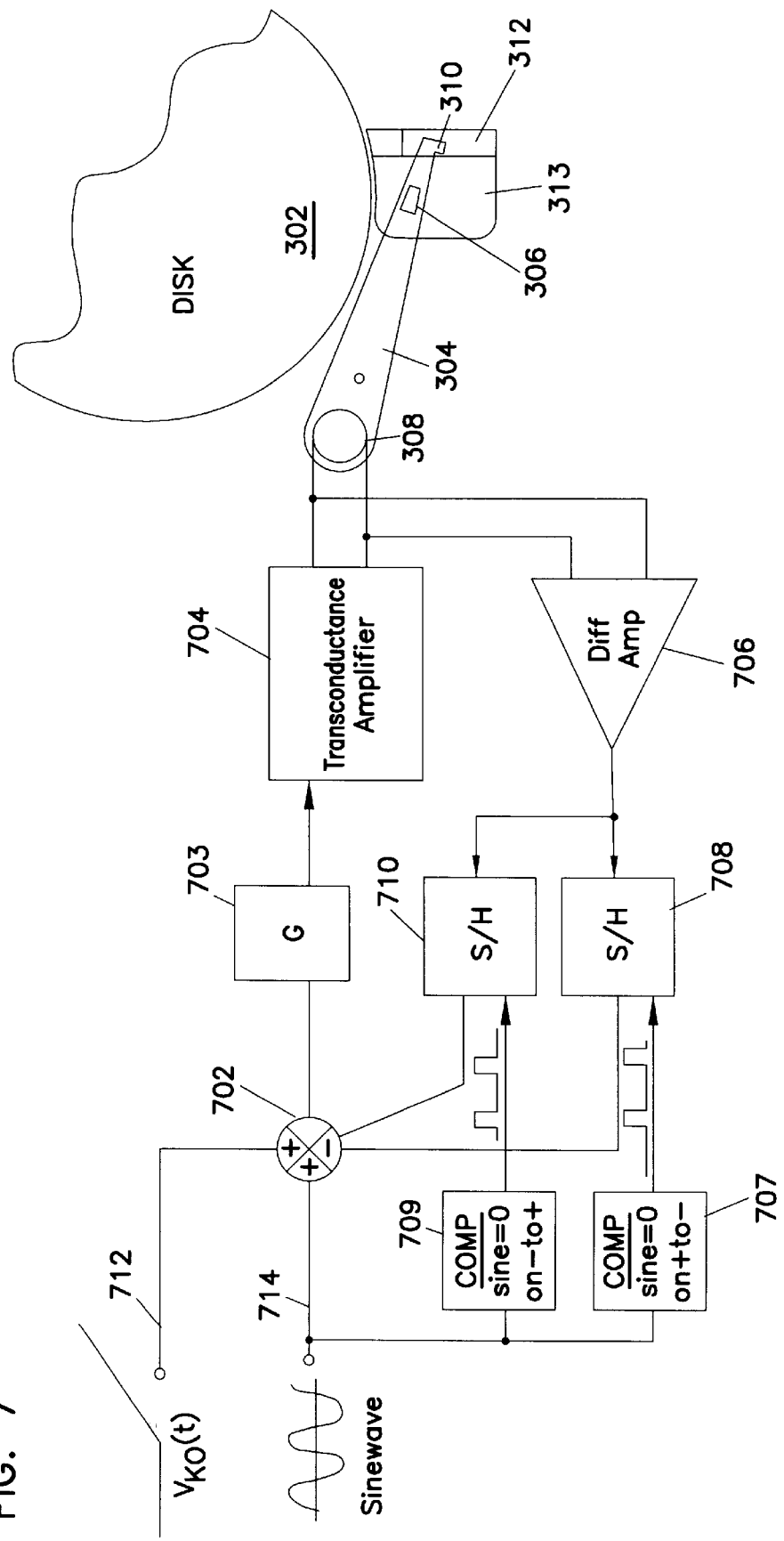
FIG. 7 is a schematic block diagram of a circuit in accordance with the present invention.

With reference to FIG. 7, an embodiment in accordance with the invention is described which overcomes the above problems and allows loading of heads at velocities as low as 1 in/sec. In such a method, a high frequency alternating current is applied to the VCM to reduce the effects of friction while simultaneously applying an increasing current that is modified by a derived analog of velocity.

FIG. 7 shows an input line 712 and an input line 714 each coupled to a summing circuit 702. The signals on each of line 712 and 714 are summed in summing circuit 702 and the output of summing circuit 702 is coupled to gain unit 703. Gain unit 703 is representative of the gain G of the entire closed loop circuit and it is to be understood that gain unit is not necessarily physically present as circuitry. The output of gain unit 703 is coupled to transconductance amplifier 704. Transconductance amplifier 704 converts the voltage received from the summing circuit 702 into a current and applies that current to the VCM 308.

A potential difference across the VCM is measured by differential amplifier 706, whose output is coupled to each of sample and hold circuits 708 and 710. The outputs of each of sample and hold circuits 708 and 710 are subtracted in summing circuit 702 from the sum of the input signals on line 712 and 714.

As is generally understood by those of skill in the art, a given voltage can easily be converted to a specified current and vice versa through the use of resistance. Therefore, application of a particular voltage at various points in the circuit of FIG. 7 is considered equivalent to applying an analogous current. Along the same line, certain embodiments of the invention may use a device different from transconductance amplifier 704 to translate a voltage to a current or may not require such a device at all. For instance, a gain amplifier will also suffice in certain embodiments of the invention.

Figure 8C:
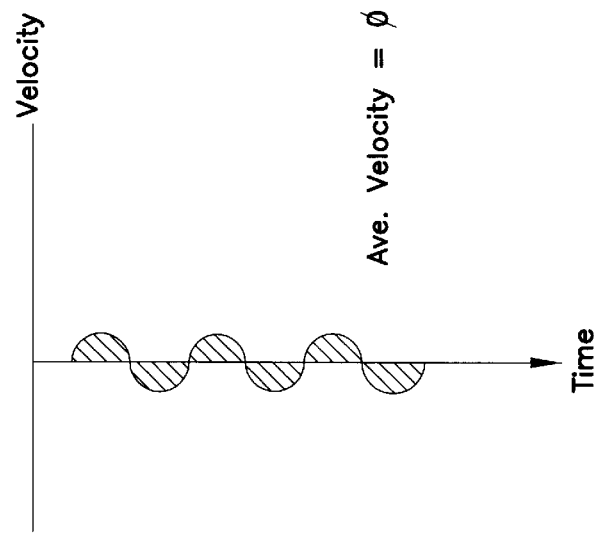
FIG. 8c is a graphical representation of Velocity vs. Time when an alternating current is applied to a VCM.
Figure 8A:
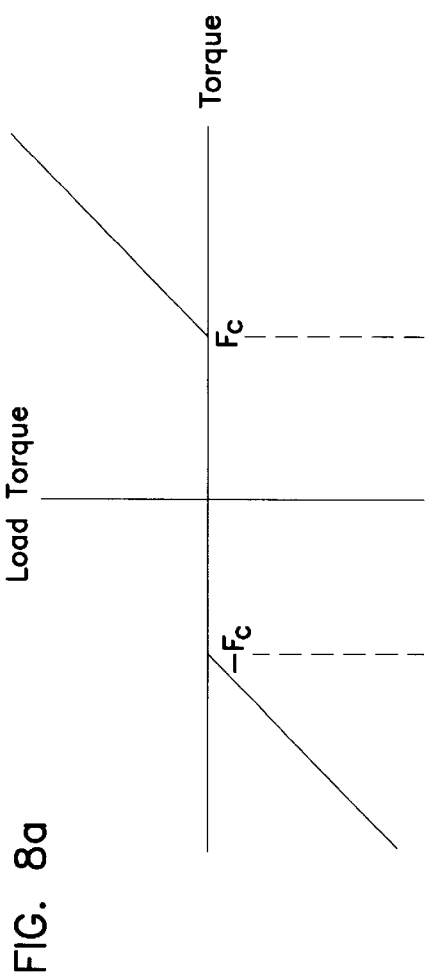
FIG. 8a is a graphical representation of Torque vs. Load Torque for a VCM.
Figure 8B:
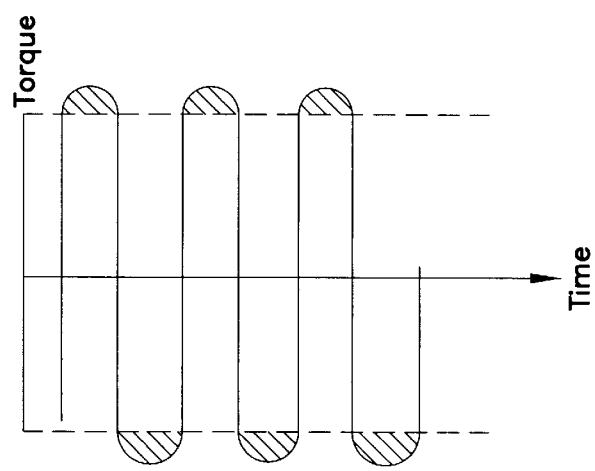
FIG. 8b is a graphical representation of Torque vs. Time when an alternating current is applied to a VCM.

In loading the heads 306 onto disk 302, errors which must be overcome in controlling velocity are primarily related to friction (e.g., coulomb friction and stiction, an unintentional adhesion between the ramp interface 310 and ramp 312). To eliminate friction without producing substantive motion, a sine wave is input on line 714. As can be seen with reference to FIGS. 8a and 8b, if a current is applied that creates a torque that just exceeds friction ($F_c$), then a small movement will take place. Generally, the minimum current that needs to be applied to overcome friction is 60 mA. By applying an alternating current whose amplitude at its peak just exceeds 60 mA (i.e., exceeds 120 mA peak-to-peak), the average velocity for the actuator assembly will be zero as shown in FIG. 8c. Therefore, the alternating current applied creates an alternating torque, creating a vibration in the actuator arm assembly and causing any other current applied to the VCM to effectively drive a frictionless load. This concept is sometimes referred to as "dither". Other embodiments of the invention may use a different sine wave magnitude. For instance, in one embodiment of the invention, to take into account any variations in the circuit and/or offsets in various parts, the sine wave magnitude is selected to be 120 mA (240 mA peak-to-peak), twice as high as that required to overcome $F_c$. Further, the frequency of the sine wave needs to be high enough so that the distance traveled and velocity is small, but the frequency is still below the system resonance. In one embodiment of the invention, a 500 Hz sine wave is used.

Figure 9:
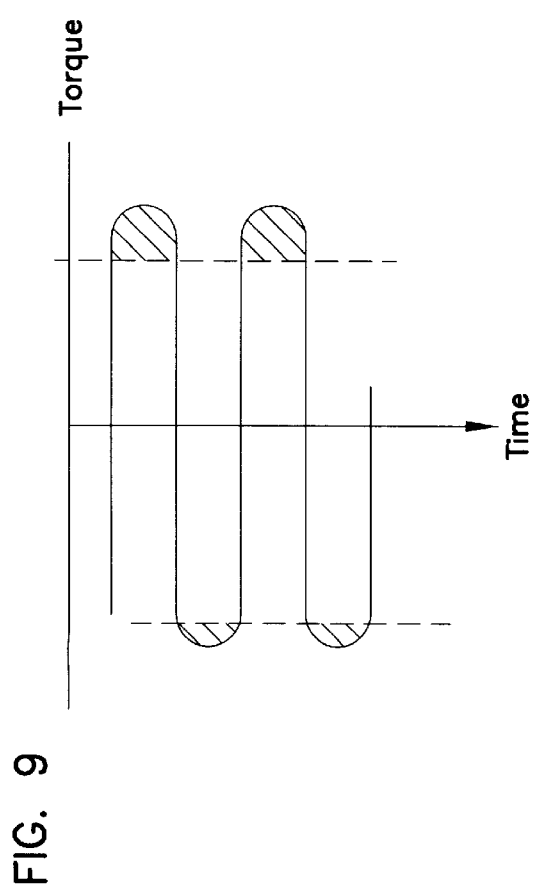
FIG. 9 is a graphical representation of Torque vs. Time when an alternating current with a DC offset is applied to a VCM.

Referring to FIG. 9, by adding a DC offset value to the sine wave, a net movement will be had in one direction, although a frictionless load is essentially still being driven. To introduce such an offset, a function $V_{K\ominus}(t)$ is input on line 712 (FIG. 7). $V_{K\ominus}(t)$ in some embodiments of the invention is a constant. However, as shown in FIG. 10, in other embodiments, $V_{K\ominus}(t)$ is an increasing function of time.

Figure 10:
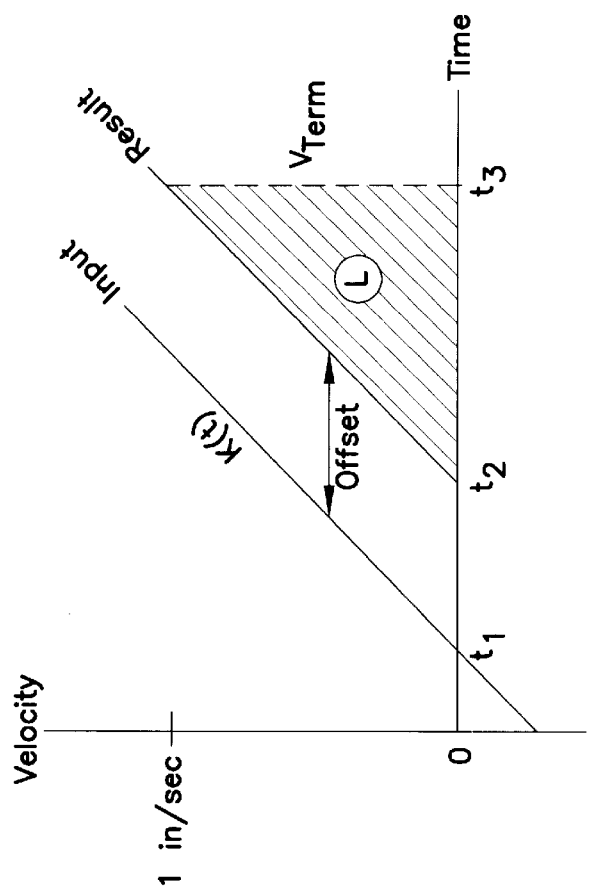
FIG. 10 is a graphical representation of Time vs. Velocity for $V_{K\ominus}(t)$ applied to a VCM in accordance with the invention.

In FIG. 10, $V_{K\ominus}(t)$ is selected so that the rate of increase is such that once the actuator arm assembly starts to move, the input will gradually increase to produce the desired velocity (e.g., 1 in/sec) when the ramp interface reaches the load point (e.g., the end of the ramp). This $V_{K\ominus}(t)$ function takes into account the ramp length which is generally fixed, as well as downward acting forces, e.g., downward forces exerted by the head suspension system, which come into play when the actuator interface is on the ramp. $V_{K\ominus}(t)$ translates to acceleration in one embodiment of the invention.

As shown in FIG. 10, because of various internal offsets and friction, the actuator arm assembly may not start moving immediately once $V_{K\ominus}(t)$ current is applied. However, once the actuator arm assembly does start moving, the offset will remain constant and the velocity will thus follow the input signal, $V_{K\ominus}(t)$.

Referring to FIG. 10, in one embodiment of the invention, $V_{K\ominus}(t)$ is a constant A times time t. The increase rate A is determined such that the area L is equal to the ramp length, 0.15 inches in one embodiment of the invention. The increase rate is also determined to give the desired terminal velocity, $V_{term}$, or $V(t_3)$. To solve for A, $V_{term}=(A\cdot T)$ where $T=(t_3-t_2)$, and $L=(T\cdot V_{term})/2$. When the desired terminal velocity is 1 in/sec and the ramp length is 0.15 inches, then $T=0.3$ sec and $A=3.33$ in/sec$^2$.

To achieve closed loop control, the potential difference across the VCM is measured by differential amplifier 706 (FIG. 7). When the VCM potential difference is sampled at or near zero current ($I_M=0$) then, as discussed above, the voltage is proportional to velocity. Since the sine wave inherently passes through zero, the sine wave is used to sample the voltage as measured by the differential amplifier when the sine wave current passes through zero. In some embodiments, the velocity sample can be taken either when the sine wave passes through zero going from a positive to a negative amplitude, or alternatively when the sine wave passes through zero going from a negative to a positive amplitude. However, in one embodiment of the invention, samples are taken in both situations, i.e., when the sine wave passes through zero from a positive to a negative amplitude and again when it passes through zero from a negative to positive amplitude. By sampling in both situations, any offsets or other common mode voltages which may exist in the circuit may be eliminated and/or overcome. The sine wave input is passed through comparator circuit 707 and 709 so that pulses are generated when the sine wave passes through zero. The pulses are applied to sample and hold circuitry, causing the sample and hold circuitry to sample the output from the differential amplifier. Each sample is then applied to summing node 702 and subtracted from the sine wave and $V_{K\ominus}(t)$ inputs to obtain the closed loop predictability performance.

As will be understood by those of skill in the art, closed loop control is beneficial, although unnecessary to receive the benefits of the invention, and various embodiments of the invention do not use closed loop control. In addition, it will also be understood by those of skill in the art that use of either an increasing current alone, without the alternating current, or an alternating current alone, without the increasing current, will achieve many of the benefits of the invention.

The invention is advantageous in that it eliminates the need for high bandwidth sampling by utilizing the vibrating motion caused by the sine wave input to reduce frictional effects.

Moreover, an embodiment of the invention eliminates any need for calibration, e.g., calibration caused by any offsets in various parts of the circuit and/or estimating the motor resistance value.

Finally, an embodiment of the invention is advantageous in that it provides 1 in/sec velocity control using only the VCM BEMF to approximate velocity. At 1 in/sec, it is believed that no data damage will occur during a load of the heads onto the disk.

It should be understood that the particular embodiments described above area only illustrative of the principles of the present invention, and various modifications could be made by those skilled in the art without departing from the scope and spirit of the invention. Thus, the scope of the present invention is limited only by the claims that follow.

What is claimed is:

1. In a disk drive system having a disk, an actuator arm assembly with a head and a ramp interface, a ramp positioned in proximity to said disk to receive said ramp interface, and a voice coil motor for controlling movement of the actuator arm assembly, a method for loading the head onto the disk, comprising steps of:

(a) creating an essentially frictionless load of said actuator arm assembly by applying an alternating current to the voice coil motor;

(b) applying, to the voice coil motor, an offset current that increases according to a predetermined function of time such that the voice coil motor moves the actuator arm assembly to exit the ramp at a predetermined velocity, where said predetermined function of time is a constant times time and is based on said predetermined velocity, where said predetermined function of time is determined prior to performing steps (a) and (b); and (c) sampling a velocity of the actuator arm assembly as the actuator arm assembly moves to exit the ramp, including:

(i) sampling a first potential difference across the voice coil motor when said applied alternating current basses through zero from a positive to a negative amplitude to obtain a first sample;

(ii) sampling a second potential difference across the voice coil motor when said applied alternating current passes through zero from a negative to a positive amplitude to obtain a second sample; and (iii) summing said first sample and said second sample.

2. The method of claim 1, wherein said creating step (a) and said applying step (b) occur simultaneously.

3. The method of claim 2, wherein said applying step (b) comprises:

(b)(i) summing said alternating current and said offset current to obtain a current sum; and (b)(ii) applying the current sum to the voice coil motor.

4. The method of claim 3, wherein the summing step (b)(i) includes subtracting a current derived from the sampled velocity.

5. The method of claim 1, wherein said predetermined velocity is 1 inch per second.

6. The method of claim 1, wherein said alternating current alternates at a frequency of approximately 500 Hertz and has an amplitude of greater than 120 milliamps peak-to-peak.

7. A disk drive system, comprising:

a disk;

an actuator arm assembly having a head and a ramp interface;

a ramp positioned in proximity to said disk to receive said ramp interface;

a first input which receive an alternating current signal;

a second input which receives an increasing current signal;

a summing circuit, operatively coupled to said first input and said second input, wherein said summing circuit produces a current sum of said alternating current signal and said increasing current signal;

a voice coil motor, operatively coupled to said actuator arm assembly and said summing circuit, which receives said current sum and, upon receipt of said current sum, causes said actuator arm assembly to behave as an essentially frictionless load driven by said increasing current signal;

a differential amplifier, operatively coupled to said voice coil motor; and sample and hold circuitry, operatively coupled to said differential amplifier, to said summing circuit, and to said first input, wherein said sample and hold circuitry samples a signal from said differential amplifier when said alternating current signal crosses zero from a positive to a negative amplitude to obtain a first sample and samples a signal from said differential amplifier when said alternating current signal crosses zero from a negative to a positive amplitude to obtain a second sample, and wherein said summing circuit is operatively configured to subtract said first sample and said second sample from said current sum.

* * * * *